United States Patent Office 3,501,058
Patented Mar. 17, 1970

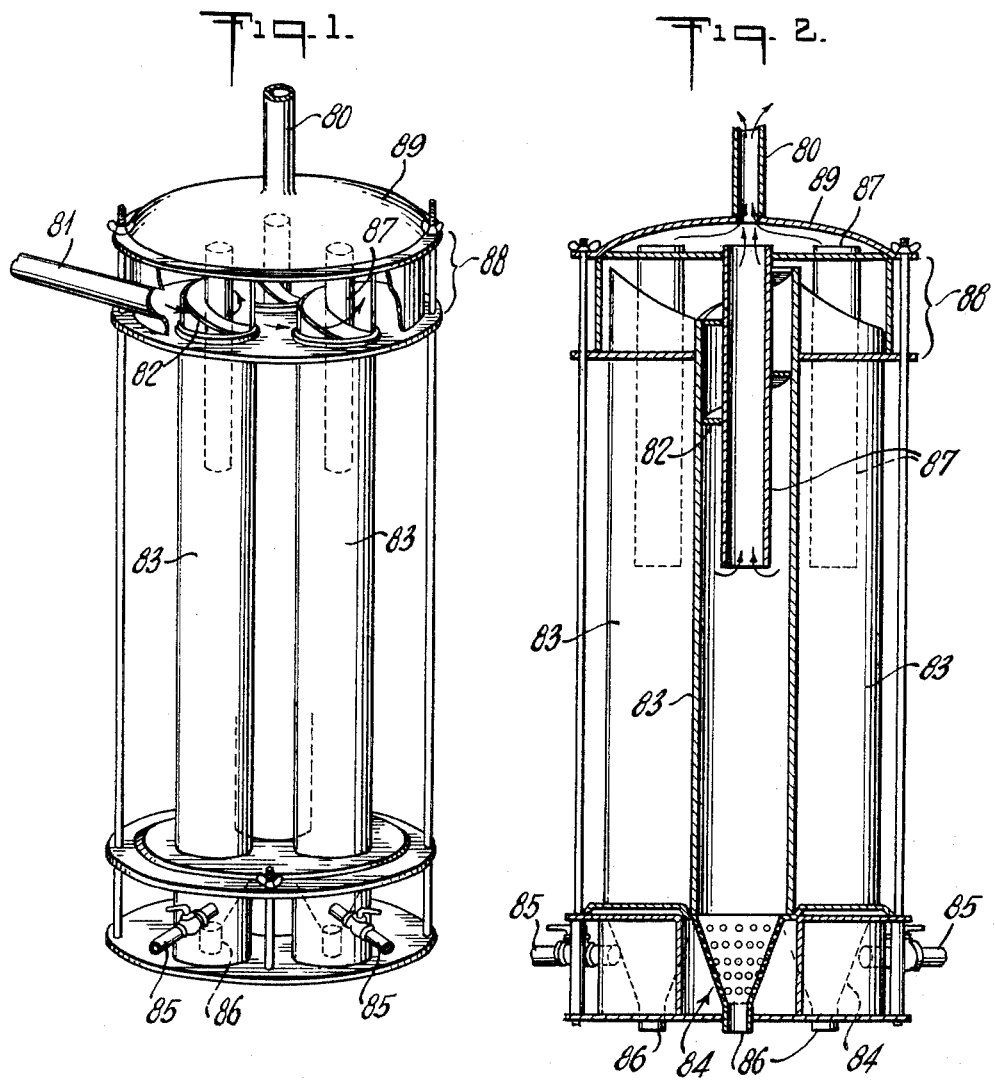

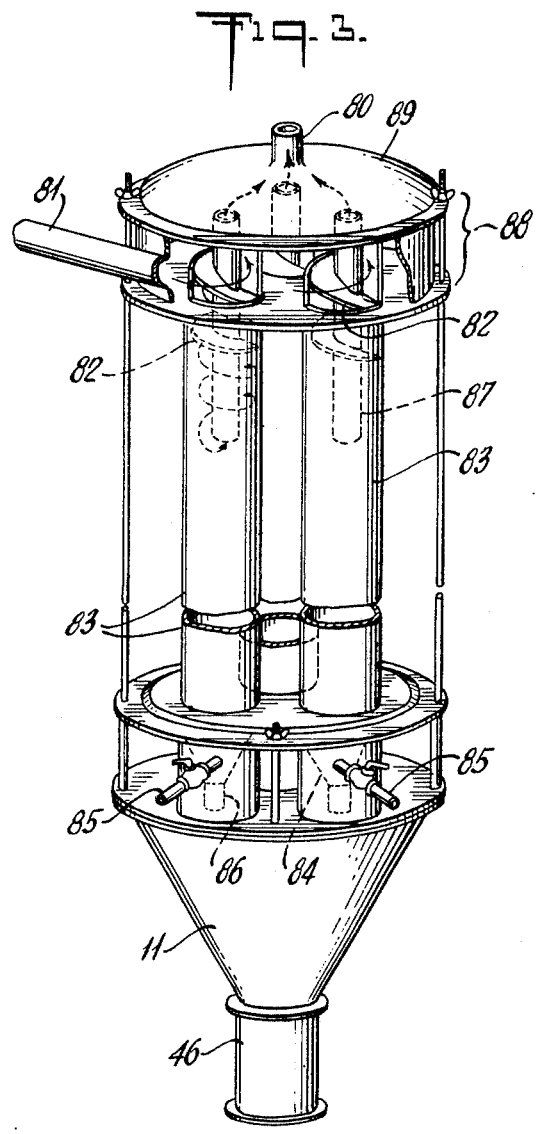

3,501,058
FILTER-AID SUPPLYING DEVICE
Anton Pfeuffer, 301 E. 78th St.,
New York, N.Y. 10021
Application Aug. 23, 1967, Ser. No. 662,834, which is a continuation-in-part of abandoned application Ser. No. 435,540, Feb. 26, 1965. Divided and this application Feb. 3, 1969, Ser. No. 795,851
Int. Cl. B67d 5/60
U.S. Cl. 222—145                2 Claims

ABSTRACT OF THE DISCLOSURE

An apparatus for supplying one or more types or grades of filter-aid material at an even and controlled rate to the fluid in a filtration system, including one or more cyclones for conditioning the material between its source of supply and a hopper from which it is fed to the fluid.

---

The present invention relates to an apparatus to provide an even and uninterrupted supply of one or more types or grades of filter-aid material to a filtration system. Moreover, this invention relates to an improvement to the apparatus described in my patent, 3,039,655, and is a division of application Ser. No. 662,834, filed Aug. 23, 1967 which is a continuation-in-part of Ser. No. 435,540 filed Feb. 26, 1965, now abandoned.

In conventional filtration systems, measured amounts of a filter-aid material such as infusorial earth are added to a flowing fluid in a pipe line and carried along the pipe line to a filter. It is desirable to be able to add the filter-aid to the pipeline carrying the fluid while said line is under pressure. It is also desirable to be able to mix as thoroughly as possible the filter-aid with the fluid in order to provide for the most effective filtering of the fluid at the filter means. The present invention relies on the principle that an increase in the effective surface area of any given feed supply device will result in an increase in the device's capability of supplying filter-aid to a filtration system.

Therefore, an object of this invention is to provide a novel and improved apparatus of the character mentioned whereby infusorial earth, or the like, can be mixed in controlled amounts to supply a filtration apparatus.

A further object is to provide a novel and improved storage device for large quantities of infusorial earth or the like and supply that earth in controlled and continuous amounts to a filtration apparatus, so as to overcome the tendency of the material to form bridging in the storage device.

A further object is that the feed supply devices described herein shall consist in part of a plurality of cylindrical containers, each containing a quantity of infusorial earth or the like, and supplying that quantity to a filtration system.

The process and device herein concerned which comprises essentially the mixing of different types of infusorial earth or the like within a hopper consisting of a plurality of cylindrical or concentric chambers, and supplying that earth in a smooth and controlled flow to a filtration system without interruption. In one application used in practice, infusorial earth or the like is stored in an open funnel shaped hopper. As the earth leaves the hopper in controlled amounts, it is fed into a gas discharge pipe line and blown into the top of a cyclonic mixing chamber. The gaseous medium causes the earth to distribute itself uniformly at the bottom of the chamber and mix evenly while under pressure with a liquid medium in contact with the chamber. However, due to the inclined surfaces of the funnel in the hopper, the earth or other bulky material has a natural tendency towards bridging, and not flowing freely into the gas discharge line. To eliminate this problem, several structural elements are added to the interior of the feed device to increase its effective surface area in contact with the earth. The structural elements may consist of a series of cylinders located either concentrically, centrally or eccentrically within the feed device. The bulky material such as infusorial earth is loaded at the top of the feed device and is contained by the structural elements located within. Moreover, by segregating the interior of the feed device into a variety of individual compartments, it is possible to load it with filter material of different consistency and allow it to mix in proportional amounts at the bottom.

The material contained within the feed device moves downward along the vertical walls of the structural elements which structural elements, contained within the feed device may be provided with individual wash-down facilities.

The cylinders contained within the feed device may either be terminated with their own funnels, or terminate against the inclined walls of the funnel area. Radial or helical fins may also be inserted into the walls of the cylinders in order to slow down the vertical descent of the bulky material into the funnel mixing area. The cylinders may also be controlled either individually or simultaneously to supply a desired mixture and feed rate of material to a filtration apparatus. Further advantages of the present invention will become evident from the description with respect to the drawings wherein:

FIG. 1 is an isometric view of an embodiment of my invention comprising three vertical cylinders each having helical blades inserted therein;

FIG. 2 is a cross-sectional view of the embodiment as shown in FIG. 1; and

FIG. 3 shows the embodiment of FIGS. 1 and 2 connected to a filter mixing apparatus.

The funnels 84 terminate into funnel 11 containing mixing chamber 46 at its base. A pipeline (not shown) to which the material is to be supplied is connected to the mixing chamber 46 and receives the filter-aid material therefrom.

The embodiment of FIGS. 1, 2 and 3 shows one method of utilizing helical blades in a material flow control cylinder. The embodiment of FIG. 1 comprises three vertical hollow cylinders terminating at the top end in chamber 88 and at the bottom in three funnels each having its own wash-down facilities.

Chamber 88 consists of a closed cylindrical chamber having an exhaust vent 80 projecting vertically out of its dome shaped roof 89 and inlet conduit 81 tangentially intersecting its sidewall. A mixture of both filter-aid material and a gas, such as air, is introduced into inlet conduit 81 from a storage bin (not shown). Due to the force of the air carrying the filter-aid material into inlet 81, the material circulates in a cyclonic wind around the inner walls of chamber 88. The cylinders 83 which terminate within chamber 88 with helical blades 82 spirally connected to hollow vent tubes 87, collect the mixture of filter-aid material and gas that is blown in through inlet 81. As shown in FIG. 2, the air portion of the filter-aid and air mixture which descends down the spiral blades, separates from the material and exhausts itself out of vent tubes 87 as shown by the direction of the arrows. This exhaust air from vent tubes 87 in the three cylinders 83 collects beneath dome 89 and exits from exhaust outlet 80 at the top of the chamber 88. This permits the filter-aid material to descend down along the walls of cylinders 83 until it is collected within the funnel portion 84 and controlled by valves 85. Valves 85 control a supply of fluid to wash the filter-aid material downward towards each outlet 86.

Due to the presence of the spiral blades 82 at the top portion of each of the tubes, the filter-aid mixture is caused to descend spirally down each of the cylinders 83 as shown by the arrows in FIG. 3 thereby improving its consistency prior to its collection at funnel 84 and its distribution from outlet 86. The contribution of filter-aid material supplied by each of the three cylinders enters funnel 11 and is directed to mixing chamber 46 where it is introduced into the main fluid line in a well understood manner. Funnel 11 may contain wash-down facilities in order to additionally aid the mixing of the filter material with the fluid from the main fluid line.

What I claim is:

1. An apparatus for supplying a filter-aid material to a filtration system comprising; a sealed chamber including top and bottom ends joined together by a cylindrical wall, an exhaust outlet connected through the top end of said chamber, an inlet port connected tangentially to said cylindrical walls and providing an opening to the inside of said chamber, at least one hollow cylinder having one end connected to the bottom of and terminating within the chamber and having its opposite end tapered into a narrow outlet, a vent tube supported within and positioned concentric to said hollow cylinder, at least one helical blade communicating with said vent tube and said hollow cylinder and spirally descending within the walls, a funnel having its inlet open to receive the outlets of each of said hollow cylinders and having its outlet connected to the filtration system, and means for providing under pressure a mixture of gas and filter-aid to said inlet port so that said mixture will circulate within the walls of said chamber and descend spirally through said cylinders, allowing said gas to separate from said filter-aid material and ascend upward through said vent tube and discharge out of said exhaust outlet and allowing said filter-aid material to further descend through the outlet of the hollow cylinder into said funnel and subsequently into the filtration system.

2. The apparatus as recited in claim 1 additionally comprising a valve connected to the tapered end of each said hollow cylinder to control the flow of fluid to wash-down the filter-aid material contained therein.

References Cited

UNITED STATES PATENTS

| | | | |
|---|---|---|---|
| 3,039,655 | 6/1962 | Pfeuffer | 222—193 X |
| 3,121,593 | 2/1964 | McIlvaine | 222—193 X |
| 3,289,894 | 12/1966 | Leeman | 222—145 |

SAMUEL F. COLEMAN, Primary Examiner

U.S. Cl. X.R.

222—193, 459, 478